US011644816B2

(12) United States Patent
Pyzer-Knapp et al.

(10) Patent No.: US 11,644,816 B2
(45) Date of Patent: May 9, 2023

(54) EARLY EXPERIMENT STOPPING FOR BATCH BAYESIAN OPTIMIZATION IN INDUSTRIAL PROCESSES

(71) Applicant: International Business Machines Corporation, Armonk, NY (US)

(72) Inventors: Edward Oliver Pyzer-Knapp, Runcorn (GB); Clyde Fare, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 17/082,663

(22) Filed: Oct. 28, 2020

(65) Prior Publication Data
US 2022/0128972 A1    Apr. 28, 2022

(51) Int. Cl.
G05B 19/4155        (2006.01)

(52) U.S. Cl.
CPC .............. *G05B 19/4155* (2013.01); *G05B 2219/32096* (2013.01); *G05B 2219/32396* (2013.01)

(58) Field of Classification Search
None
See application file for complete search history.

(56) References Cited

U.S. PATENT DOCUMENTS 7,027,885 B1 *   4/2006  Barto ................ G06Q 50/04
                                                    700/121
10,535,017 B2   1/2020  Johnson et al.
2018/0095936 A1   4/2018  Bonnecaze et al.
2020/0167691 A1   5/2020  Golovin et al.
2022/0108125 A1 *  4/2022  Dai ................... G06K 9/6263

OTHER PUBLICATIONS

UK Search Report dated Mar. 30, 2022 received in Application No. GB2114347.4, 4 pages.
Liu, J., et al., "Batch Bayesian optimization via adaptive local search", Applied Intelligence, Published online Sep. 19, 2020, 16 pages.
Azimi, J., et al., "Hybrid Batch Bayesian Optimization", Appearing in Proceedings of the 29th International Conference on Machine Learning, Feb. 2012, 8 pages.
Cho, H., et al., "DEEP-BO for Hyperparameter Optimization of Deep Networks", arXiv:1905.09680v1, May 23, 2019, 26 pages.

(Continued)

*Primary Examiner* — Sean Shechtman
(74) *Attorney, Agent, or Firm* — Scully, Scott, Murphy & Presser, P.C.; Daniel P. Morris

(57) ABSTRACT

Real-time intervention of an industrial process can include searching for a batch of candidate configurations for use by the industrial process, the batch of candidate configurations searched for by performing a batch Bayesian optimization (BBO). The batch of candidate configurations is transmitted to the industrial process to use in running the industrial process. A result of the run is received from the industrial process. Using the result in the BBO, a next batch of candidate configurations is searched. Whether a stopping criterion is met is determined, based on the next batch of candidate configurations and by applying a function to a BBO acquisition score. Responsive to determining that the stopping criterion is met, searching for the next batch of candidates is terminated.

20 Claims, 8 Drawing Sheets

(56) References Cited

OTHER PUBLICATIONS

Groves, M., et al., "Efficient and Scalable Batch Bayesian Optimization Using K-Means", https://arxiv.org/pdf/1806.01159.pdf, arXiv:1806.01159v2, Sep. 19, 2018, 8 pages.

Lorenz, R., et al., "Stopping criteria for boosting automatic experimental design using real-time fMRI with Bayesian optimization", https://arxiv.org/pdf/1511.07827.pdf, arXiv:1511.07827v2, Mar. 22, 2016, 8 pages.

Jasrasaria, D., et al., "Dynamic Control of Explore/Exploit Trade-Off in Bayesian Optimization", https://arxiv.org/pdf/1807.01279.pdf, arXiv:1807.01279v1, Jul. 3, 2018, 8 pages.

Nguyen, V., et al., "Budgeted Batch Bayesian Optimization", 2016 IEEE 16th International Conference on Data Mining (ICDM), Dec. 12-15, 2016, 6 pages.

Dai, Z., et al., "Bayesian Optimization Meets Bayesian Optimal Stopping", Proceedings of the 36th International Conference on Machine Learning, PMLR 97, 2019, http://proceedings.mlr.press/v97/dai19a/dai19a.pdf, Accessed on Oct. 28, 2020, 11 pages.

Martin, S., "Bayes and optional stopping", http://srmart.in/bayes-optional-stopping/, Sep. 20, 2017, 6 pages.

Gonzalez, J., et al., "Batch Bayesian Optimization via Local Penalization", Appearing in Proceedings of the 19th International Conference on Artificial Intelligence and Statistics (AISTATS) 2016, http://proceedings.mlr.press/v51/gonzalez16a.pdf, Accessed on Oct. 28, 2020, pp. 648-657.

NIST, "NIST Cloud Computing Program", http://csrc.nist.gov/groups/SNS/cloud-computing/index.html, Created Dec. 1, 2016, Updated Oct. 6, 2017, 9 pages.

\* cited by examiner

EARLY EXPERIMENT STOPPING FOR BATCH BAYESIAN OPTIMIZATION IN INDUSTRIAL PROCESSES

BACKGROUND

The present application relates generally to computers and computer applications, and more particularly to production trials searching for desired results and early stopping of trial productions.

Bayesian optimization based technologies have shown strong performance for tasks related to the optimization of expensive to evaluate functions. Examples of these functions include synthesis of molecules for medicine discovery, configuration of machine learning systems, and the design of electronic chips. Batch Bayesian Optimization (BBO) extends this technology to allow the evaluation of multiple candidates simultaneously. In BBO, the optimization is considered complete when the allocated budget is exhausted, or the selection criterion fails to identify a new candidate to sample. However, it may be observed that the optimal candidate is observed before the budget is exhausted, which results in unnecessary expense incurred for the entity performing the experiment.

BRIEF SUMMARY

A computer-implemented method and system of real-time intervention of an industrial process can be provided. The method, in an aspect, can include searching for a batch of candidate configurations for use by the industrial process, the batch of candidate configurations searched for by performing a batch Bayesian optimization (BBO). The method can also include transmitting the batch of candidate configurations to the industrial process to use in running the industrial process. The method can also include receiving from the industrial process a result of the run. The method can also include using the result in the BBO to search for a next batch of candidate configurations. The method can also include, based on the next batch of candidate configurations and by applying a function to a BBO acquisition score, determining whether a stopping criterion is met. The method can further include, responsive to determining that the stopping criterion is met, terminating a search for the next batch of candidates. The method can further include, responsive to determining that the stopping criterion is not met, transmitting the next batch of candidate configurations to the industrial process to use in running the industrial process, and repeating the using of the result in the BBO to search for a next batch of candidate configurations and the determining of whether the stopping criterion is met.

A system for real-time intervention of an industrial process, in one aspect, can include a hardware processor and a memory device coupled with the hardware processor. The hardware processor can be configured to search for a batch of candidate configurations for use by the industrial process, the batch of candidate configurations searched for by performing a batch Bayesian optimization (BBO). The hardware processor can also be configured to transmit the batch of candidate configurations to the industrial process to use in running the industrial process. The hardware processor can also be configured to receive from the industrial process a result of the run. The hardware processor can also be configured to use the result in the BBO to search for a next batch of candidate configurations. The hardware processor can also be configured to determine whether a stopping criterion is met, based on the next batch of candidate configurations. The hardware processor can also be configured to, responsive to determining that the stopping criterion is met, terminate a search for the next batch of candidates. The hardware processor can also be configured to, responsive to determining that the stopping criterion is not met, transmit the next batch of candidate configurations to the industrial process to use in running the industrial process, and repeat using of the result in the BBO to search for a next batch of candidate configurations and determining of whether the stopping criterion is met.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
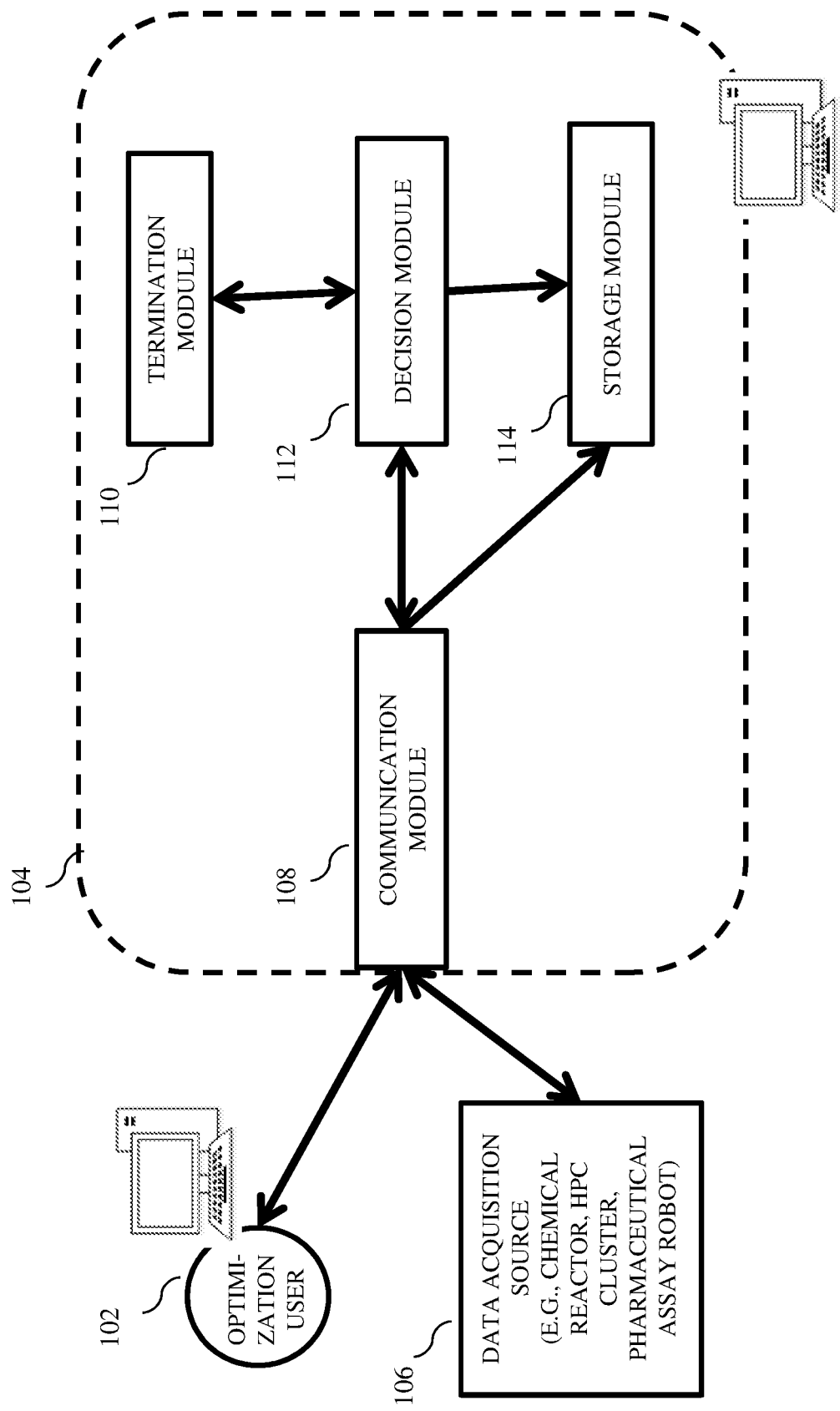
FIG. 1 is a diagram illustrating a system implementing early stopping of BBO search in an embodiment.

In an aspect, early stopping or real-time invention of experimental or trial production runs, which for example, produces a product or process, in a real physical system such as a manufacturing system or another, can be provided. Methods and systems can be provided in one or more embodiments for real-time intervention in a batch Bayesian optimization (BBO) system, for example, running a real physical system, to automatically determine or decide whether to terminate a BBO search early if a predetermined threshold is reached, for example, if a particular criterion is met. For example, a manufacturing system can be controlled to stop its experimental or trial production runs early in looking for an optimal result in production. Experiments show that such a methodology reduces the average cost associated with a BBO search, for example, which can involve iteratively running a real physical machine or system.

A method, for example, can include determining whether the threshold is met by applying a function to a batch Bayesian optimization (BBO) acquisition score which determines the likelihood that evaluating the next batch will provide significant value. The function includes a target variable and a batch percentage variable, the target variable being representative of a statistical significance level required to terminate the search, and the percentage variable determining how much of the batch needs to fail to terminate the search. The method can also include sending a signal to the batch Bayesian optimization system to terminate the search early, if a threshold is met or reached.

Bayesian optimization is used in optimizing black-box functions or unknown functions. Bayesian optimization directs a search to find the minimum or maximum of an objective function, which is not known. A surrogate model or a probability representation of the black-box function (e.g., probabilistic model) may be built to approximate the true function based on available parameter values and associated observations, for example, fit a Gaussian process using the available data. A mean from the Gaussian process can be used to model the black-box function. An acquisition function, for example, a function of the surrogate model, determines an optimal location to sample next in the modeled parameter space. For example, the next sample can be at a location where the acquisition function is maximized. A corresponding output to the new sample is obtained. This corresponding output can be an actual or true observation obtained based on using the new sample. For instance, the actual or true observation can be obtained from running a real experimental or trial manufacturing production process. The new sample and the corresponding output (observation) is then used to update the surrogate model. This process of finding or searching for a next sample, obtaining actual observation using that next sample, and updating the surrogate model can be repeated, for example, until a budget is met. Batch Bayesian optimization (BBO) finds optimal samples in batches.

A methodology disclosed herein includes intervening to pre-maturely terminate a BBO search based upon a criterion. In an embodiment, whether this criterion is met can be determined by applying an additional function to a BBO acquisition score which determines the likelihood that evaluating the next batch, which can be expensive, will provide significant value. For example, in an embodiment, a criterion for terminating a BBO search can be determined as a function of a BBO acquisition function or of a BBO acquisition function value.

In an embodiment, a criterion for terminating a BBO search early considers two variables, a target criterion and a batch percentage criterion. The target criterion represents the statistical significance required to terminate the search (e.g., the target criterion can take a binary form, e.g., 0: full significance, 1: no significance) and the percentage criterion determines how much of the batch needs to fail to terminate the search (e.g., 0%—none of the batch, 100%—all of the batch). In an embodiment, these criteria can be set or predetermined, based on the cost of acquiring a batch (e.g., more aggressive strategies can be used when the cost is high) and the importance of complete optimization (e.g., more aggressive strategies can be used when complete optimization is not essential). If the criterion for termination is met, then a signal can be sent to a BBO engine to terminate the search early, thus saving the cost of evaluating additional batches.

Such methodology can be integrated with, but not limited to, laboratory based experimental design, a manufacturing process, high-performance computing, and/or other physical or industrial processes. FIG. 1 is a diagram illustrating a system implementing early stopping of BBO search in an embodiment. The components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

A Bayesian optimization system 104 can be implemented on a computer system, for example, including one or more processors, and can include computer-implemented modules such as a communication module 108, a decision module 112, a termination module 110 and a storage module 114. The communication module 108 may include a network interface and the like, which can transmit and receive data to and from one or more computer systems and/or processors, for example, communicate with a user or client computer, communicate with one or more controllers that control a manufacturing or like processes (also referred to as a data acquisition source). The storage module 114 may be coupled with a memory device or a storage device for storing data, and may include a database for storing and accessing data.

A user computer can have a user interface or front-end application 102 which can communicate with the Bayesian optimization system 104. An optimization user, e.g., via the user interface or front-end application 102 may communicate optimization criteria to a Bayesian optimization system 104, for example, to initiate a process of experimenting or trial runs with different parameter values in a process such as in a manufacturing process to obtain an outcome or a resulting product. Other examples can include discovering molecules, a process in pharmaceutical applications such as discovering medicine, and any other process in which an optimization solves for or determines one or more parameters or values used in the process. Another example can include training machine learning models such as training a neural network using different hyperparameter values obtained using Bayesian optimization.

An example of the user interface 102 can include a web portal or a web browser interface, a front-end user interface implemented for the Bayesian optimization system 104, and/or the like. The optimization user can run such a computer-implemented user interface 102 to communicate with the Bayesian optimization system 104, providing the optimization criteria and start a process such as an experimental design process, a manufacturing process and/or another process. Examples of optimization criteria can include budget (e.g., the number of iterations to perform in optimizing) batch size, aggression of early termination. For example, "aggression of early termination" can be represented in a numerical form (e.g., a floating point number from 0 to 1, another number value, a binary value such as 0 (no aggression) or 1 (aggression), or a number of value settings representing different degrees of aggression (e.g., 0, 1, 2, 3, 4, 5), or any other representation. In an embodiment, such settings can be transformed or translated into one or more values (e.g., mapped to target criterion and batch percentage criterion) to be used in applying a function to a BBO acquisition function score in determining a criterion terminating a BBO search early. In an embodiment "aggression of early termination" input by a user can include specific values, for example, target criterion and batch percentage criterion. "Aggression of early termination" may be input or indicated in other ways or manner. A communications module 108 can receive the communication from the user interface 102.

In another aspect, the Bayesian optimization system 104 can be automatically programmed or triggered to start with an initial set of criteria (e.g., budget, batch size, aggression of early termination), for example, without the optimization user's explicit command to start via the user interface.

A decision module 112 of the Bayesian optimization system 104 generates a batch of configurations and communicates the configurations to a data acquisition source 106, for example, makes a decision as to which candidate configurations to try next. For example, the decision module 112 runs or performs a batch Bayesian optimization, which generates the batch of configurations. The batch of configurations includes different parameter values the data acquisition source 106 can try or experiment with, in order to obtain desired results or properties. For instance, the communications module 108 sends the batch of configurations to the data acquisition source 106 to perform a process or a run (e.g., an experimental process or trial run) to produce an actual output (e.g., manufacture a product) using the communicated parameters.

Data acquisition sources 106 can include a physical system that performs or activates a real process. Examples of such data acquisition source can include a robot or a controller which performs a physical process such as a manufacturing process, e.g., an industrial process for manufacturing products such as paints, a robot or a controller that performs tasks such as an assay and/or molecule discovery; a machine learning system that trains a machine learning model, e.g., a neural network. Examples of configurations or parameters received from the decision model to experiment can include: concentrations of ingredients, rate of mixing of ingredients, temperature at which the ingredients are mixed, time or duration of mixing they are mixed for, for example, in chemical manufacturing. An example of a result or return value may include the yield of the process resulting from performing the chemical manufacturing process using those configurations. Another example can be a batch of hyperparameter values to use in training a neural network.

The data acquisition source 106 generates a result of the configurations (e.g., as a result of performing the real process) and communicates the result to the Bayesian optimization system 104, for example, via the communications module 108. The result includes one or more properties of an outcome obtained from the actual run of a process. Properties can indicate how well the data acquisition source produced its product or end product using the configuration received from the decision module 112. The storage module 114 of the Bayesian optimization system 104 stores the results of the configurations, for example, in a storage device.

The decision module 112 of the Bayesian optimization system 104 uses the result and generates another (next) batch of configurations using BBO methodology. For example, the result is used to update a surrogate model and an activation function is used to find the next batch of configurations. The decision module 112 communicates the values obtained from the BBO for this batch to a termination module 110. Using the values, the termination module 110 evaluates whether to terminate the search of looking for more optimal configurations before the budget is exhausted. The termination module 110, for example, applies a function to the BBO acquisition function, for example, using one or more values associated with an "aggression of early termination", which can be set based on user input or predefined, to determine whether the search is end early. Different acquisition functions can be used such as probability of improvement, expected improvement and/or others. If the termination module 110 determines that a criterion is met for stopping, the termination module 110 signals the decision module 112 to stop performing the optimization, to stop searching for more configurations. The Bayesian optimization system 104, for example, via the decision module 112 and the communication module 108, also sends a signal to the data acquisition source 106 that searching for optimal parameters has stopped. In an embodiment, the sending of such stop signal can control the data acquisition source 106 to stop its process, e.g., trial runs of a process that produces a product. The decision module 112 can also send the final configurations which reflect the most optimal set from the sets or batches of configurations from the different BBO iteration runs to the data acquisition source 106 via the communication module 108 and/or to the optimization user via the user interface 102.

If the termination module 110 determines that the criterion is not met for stopping, the decision module 112 performs another iteration of BBO, sending the parameter values (batch of configurations) obtained from the BBO for this batch to the termination module 110, for evaluating again whether the criterion is met for stopping before the batch is exhausted. The values are also sent to the data acquisition source 106 to again perform its process using those parameter values. The optimization iterates or repeats with the data acquisition source 106 iterating the performing of its experiment using the configurations determined from that iteration, until the termination module 110 determines that the criterion is met, or the budget is exhausted. If the budget is exhausted, final optimized configuration (e.g., the most optimal configuration set) can be sent to the optimization user via the user interface 102 through the communication module 108.

Figure 2:
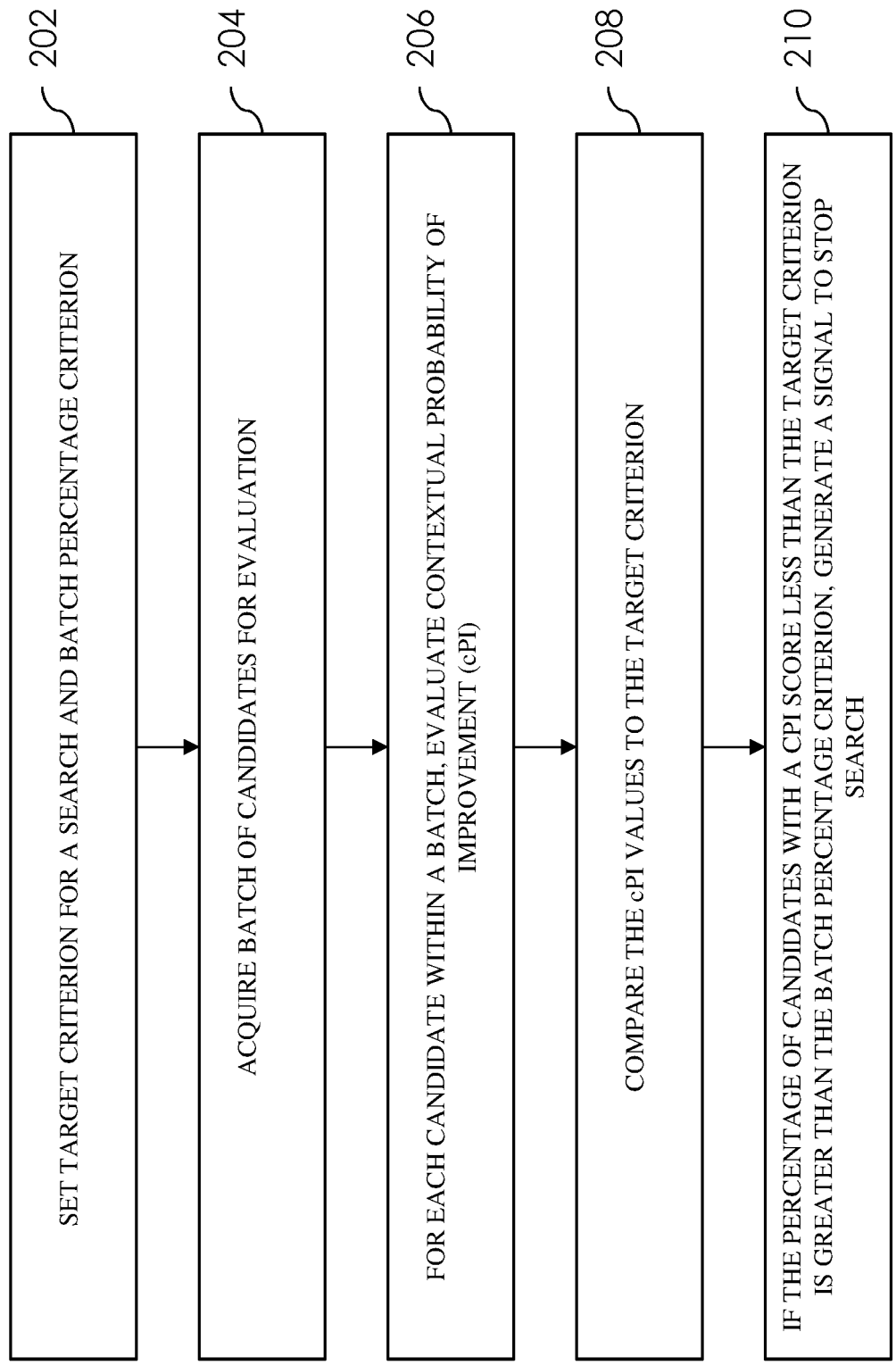
FIG. 2 is a flow diagram illustrating a method of determining whether to terminate a BBO search early in an embodiment.

FIG. 2 is a flow diagram illustrating a method of determining whether to terminate a BBO search early in an embodiment. The method can be implemented, performed by or run on one or more hardware processors.

At 202, a target criterion for the search and a batch percentage criterion can be set or predetermined. In an embodiment, the target criterion can be represented by a float (a floating point value) between 0 and 1. In an embodiment, the batch percentage criterion can be represented by a percentage (%) from 0-100. The target and the batch percentage criteria can be predetermined or predefined based on the cost of performing the modeling and experiments performed based on the modeling, and are configurable. For instance, if the cost of experiment (e.g., running a real system) is high or expensive, the target and/or the batch percentage criteria can be set more aggressively, for example, so as to stop the search earlier than would be if set at less aggressive values. For instance, the target criterion and the batch percentage criterion can be a user-defined parameter received from a user and/or mapped from a user-input data indicating as how aggressively to pursue early stopping.

At 204, a batch of candidates for evaluation is acquired using a batch Bayesian optimization (BBO) methodology. For example, a surrogate model (also referred to as response surface model) or probabilistic model can be built based on available parameter values and associated observations (e.g., results or output). An acquisition function associated with the surrogate model can be used to find a batch of candidates.

At 206, for example, for each candidate within a batch, the contextual probability of improvement (cPI) is evaluated, where the cPI is formulated as follows:

$$cPI = \Phi\left(\frac{y_{pred} - f^* + c_v}{\sigma}\right)$$

where $$c_v = \frac{\overline{\sigma^2}}{f^*}$$

where $\overline{\sigma^2}$ is the mean of the variances contained within the sampled posterior distribution and is distinguished from $\sigma$ which is the individual variance of a prediction for a particular point in the posterior, $y_{pred}$ represents the predicted value from the candidate (the value that the Bayesian model predicts for a candidate with a given configuration), f* represents the best candidate discovered thus far (e.g., the value generated by the data acquisition source for the best candidate evaluated thus far) and $\Phi$ is the cumulative distribution function (CDF) of a standard normal distribution. In an embodiment, all of these values are extracted from the BBO methodology.

At 208, the calculated values of cPI are then compared to the target criterion. For example, each candidate's cPI score or value is compared with the target criterion. The number of candidates in the batch having cPI scores less than the target criterion is determined. The percentage or proportion of the number of candidates in the batch having cPI scores less than the target criterion among all candidates in the batch is determined.

At 210, if the percentage of candidates with a cPI score less than the stopping criterion (the target criterion) is greater than a pre-determined percentage (the batch percentage criterion), then a signal can be generated and/or sent to a BBO engine, which for example, performed BBO at 204, to terminate the search, for example, performing BBO to obtain more candidates.

Figure 3:
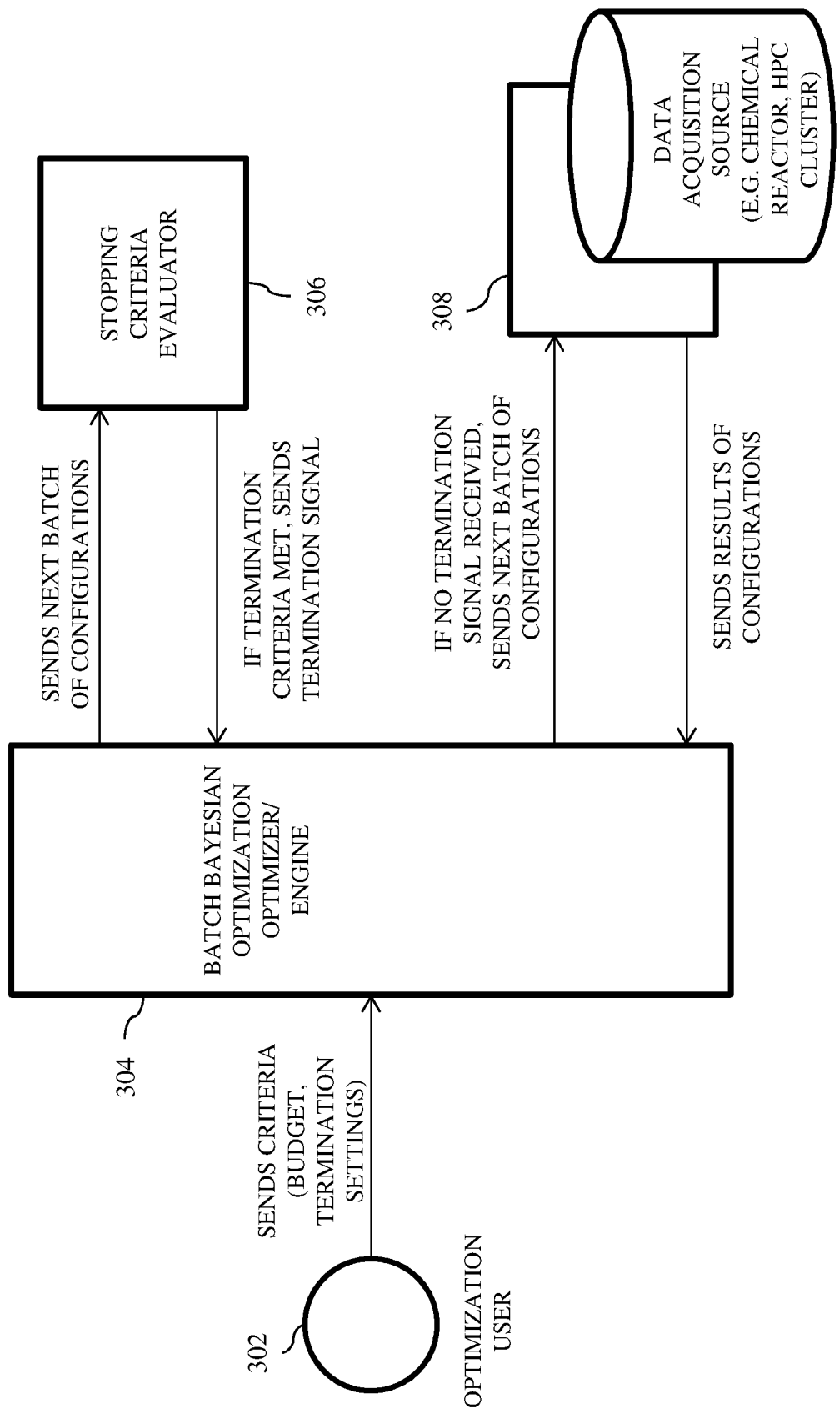
FIG. 3 is a block diagram illustrating system components in an embodiment.

FIG. 3 is a block diagram illustrating system components in an embodiment. The components shown include computer-implemented components, for instance, implemented and/or run on one or more hardware processors, or coupled with one or more hardware processors. A batch Bayesian optimization engine 304 can receive optimization criteria such as budget, batch size, and termination setting from a user, for example, via a user interface 302. The batch Bayesian optimization engine 304 performs a batch Bayesian optimization method and determines a batch of configurations to try in a process such as a manufacturing process by a data acquisition source 308. The data acquisition source 308 performs its experiment or testing using the batch of configurations and sends a result to the batch Bayesian optimization engine 304. For example, in an embodiment, sending of the batch of configurations automatically controls a manufacturing process to perform its manufacturing, for example, activates manufacturing equipment to run. As another example, in an embodiment, sending of the batch of configurations automatically controls or activates a robot to perform its task such as an assay. The batch Bayesian optimization engine 304 receives from the data acquisition source 308 a result of the production, for example, one or more properties of a product or process resulting from performing the process such as a manufacturing process. For example, a result can be how well a product produced using the configurations eliminated bacteria. As another example, a result can be how accurately a neural network trained using the configurations performed a classification task. The batch Bayesian optimization engine 304 stores the result and the associated configurations. Based on the results of different batches of configurations, the batch Bayesian optimization engine 304 can determine which configurations are most optimal out of the configurations which have been tested.

The batch Bayesian optimization engine 304 acquires a next batch of configurations, for example, by updating the surrogate model using the result received from the data acquisition source 308 and applying an acquisition function as a function of the updated surrogate model. The batch Bayesian optimization engine 304 sends the next batch of configurations to a stopping criteria evaluator 306. The stopping criteria evaluator 306 determines whether to stop searching for a next batch of configurations, for example, by applying a function to the acquisition function of the batch Bayesian optimization engine 304. For example, the stopping criteria evaluator 306 may perform the method described with reference to FIG. 2. The stopping criteria evaluator 306 returns or sends to the batch Bayesian optimization engine 304 a signal indicating whether to stop the searching. For instance, if a stopping criterion is met, the stopping criteria evaluator 306 sends a signal indicating that the search is to be stopped. Otherwise, the stopping criteria evaluator 306 can send a signal or an indication that the searching is to be continued.

If no termination or stop signal is received, the batch Bayesian optimization engine 304 sends the next batch of configurations to the data acquisition source 308 to use in its real or actual process. The data acquisition source 308 performs its process using this next batch of configurations, returning the result to the batch Bayesian optimization engine 304. The result is stored. The Bayesian optimization engine 304 again updates the surrogate model based on the result and applies an acquisition function to find a next batch of configurations.

Finding next batch of configurations at 304, evaluating whether stopping criteria is met at 306 and sending the next batch of configurations to the data acquisition source 308, wherein the data acquisition source 308 performs its test process, and storing the result received from the data acquisition source 308 is repeated until the stopping criteria evaluator 306 determines that the stopping criteria is met or the specified budget (e.g., number of iterations) is exhausted. Responsive to the optimization search being completed (e.g., stopping criteria is met or the specified budget is exhausted), the batch Bayesian optimization engine 304 may send a batch of configurations determined to be optimal, e.g., those that produced optimal result, to the user, e.g., via the user interface 302. In an aspect, the batch Bayesian optimization engine 304 may also control the data acquisition source 308 to stop its experiment or trial process. For example, the batch Bayesian optimization engine 304 may control or deactivate a physical process such as a manufacturing process to stop a procedure in manufacturing. For example, the batch Bayesian optimization engine 304 may control a physical process or equipment to stop or to continue its process. As another example, the batch Bayesian optimization engine 304 may also control a neural network to stop a process of training the neural network, e.g., to stop experimenting with different hyperparameters in training the neural network.

Figure 4:
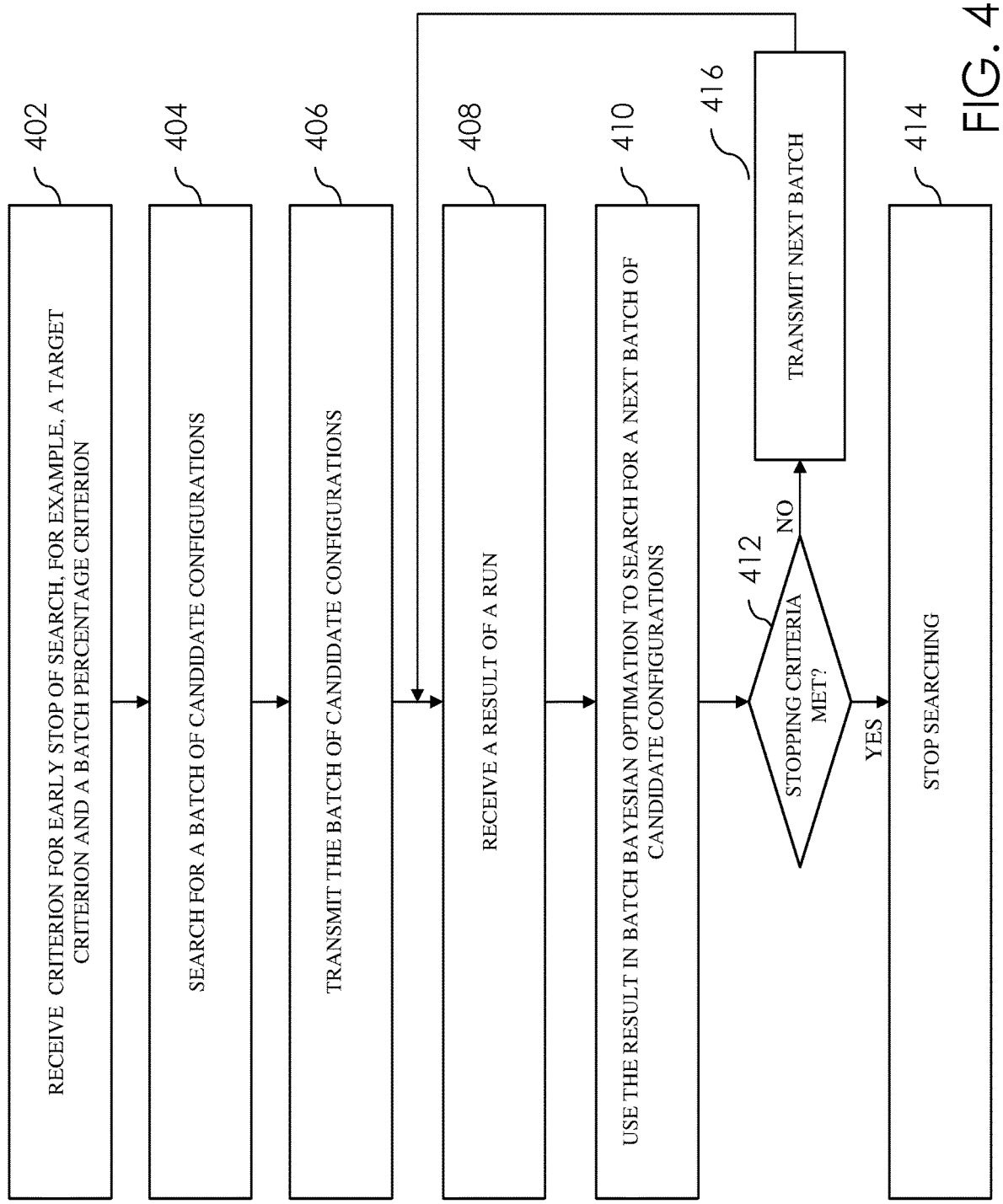
FIG. 4 is a flow diagram illustrating a method in an embodiment.

FIG. 4 is a flow diagram illustrating a method in an embodiment. The method can be a computer-implemented method running on one or more hardware processors. The method performs real-time intervention in a batch Bayesian optimization (BBO) system, automatically determining whether to terminate a BBO search early if a predetermined threshold is reached. In an aspect, running a data acquisition source, for example, in real-time, such as a manufacturing process and/or a robot can be costly. For instance, iteratively running a data acquisition source with new or next configurations may consume power, equipment and computer resources. The method in an embodiment intervenes in real-time to stop early iterative runs of a data acquisition source, for instance, a manufacturing process and/or a robot performing a task. For example, the method may include controlling a physical machine in its process in real-time, and/or causing such controlling of a physical machine. Such early stopping can reduce power consumption, consumption of equipment and computer resources, including but not limited to, memory device and storage devices spaces.

At 402, a termination setting such as data indicating how aggressively to pursue early stopping of a BBO search can be received. For example, a target criterion and a batch percentage criterion can be received. As another example, information that can be mapped to such criterion can be received. In an embodiment, such data, for example, the target criterion and the batch percentage criterion are configurable. In an embodiment, the target criterion and the batch percentage criterion can be received from a user. In an embodiment, the target criterion represents a statistical significance level needed to terminate the search and the batch percentage criterion representing how much of a batch needs to fail to terminate the search.

At 404, a batch of candidate configurations is searched for, for use by the industrial process. In an embodiment, the batch of candidate configurations searched for by performing a batch Bayesian optimization (BBO), for example, as described above.

At 406, the batch of candidate configurations is transmitted to the industrial process to use in running the industrial process. In an embodiment, transmitting of the batch of candidates controls a machine such as a robot associated with the industrial process to perform its task or run, for instance, to manufacture or produce a product. At 408, a result of a run or production is received from the industrial process. For example, the result can include one or more properties of the manufactured product.

At 410, the result is used in the BBO to search for a next batch of candidate configurations. At 412, it is determined whether a stopping criterion is met, for example, based on the next batch of candidate configurations and by applying a function to a BBO acquisition score, for example, using the received data indicating how aggressively to pursue early stopping of a BBO search.

In an embodiment, applying the function includes evaluating data associated with the next batch of candidates based on the target criterion and the batch percentage criterion. In an embodiment, determining whether a stopping criterion is met based on the next batch of candidate configurations can include, for each of the candidate configurations in the batch, computing a contextual probability of improvement (cPI) score, and determining that a percentage of the candidates configurations with the cPI score less than the target criterion is greater than the batch percentage criterion, for example, as described above with reference to FIG. 2. For instance, the cPI score can be determined as a cumulative distribution function (CDF) of a standard normal distribution of a combination of a mean of variances contained within a sampled posterior distribution, a predicted value from a candidate and a best candidate value discovered among iterations of BBO, for example, as described above with reference to FIG. 2.

At 414, responsive to determining that the stopping criterion is met, a search for the next batch of candidates is stopped or terminated. In an embodiment, the industrial process can be controlled to stop running. For example, a processor performing the BBO, responsive to determining that the stopping criterion is met, may send a signal to the industrial process or automatically control the industrial process to stop its iteration of runs. An optimal batch of configurations among batches of configurations found can be sent to the industrial process. For instance, the industrial process can be controlled to use the optimal batch of configurations in its production. Such optimal batch of configurations can also be sent to a user, for example, via a user interface.

At 416, responsive to determining that the stopping criterion is not met, the next batch of candidate configurations is transmitted to the industrial process to use in running the industrial process. For example, a processor performing the BBO, responsive to determining that the stopping criterion is not met, may send the next batch of candidate configurations to the industrial process for another iteration of running. For instance, transmitting the next batch of candidate configurations automatically controls the industrial process to run in real-time. The processes or steps of using the result in the BBO to search for a next batch of candidate configurations and determining of whether the stopping criterion is met can be repeated or iterated. In an aspect, the method described above can provide early stopping intervention in real-time of a real running process such as a manufacturing or industrial process. In an aspect, the method in an embodiment can automatically control a physical machine such as a robot associated with a manufacturing or industrial process in real-time to continue and/or stop its production iterations.

Figure 5:
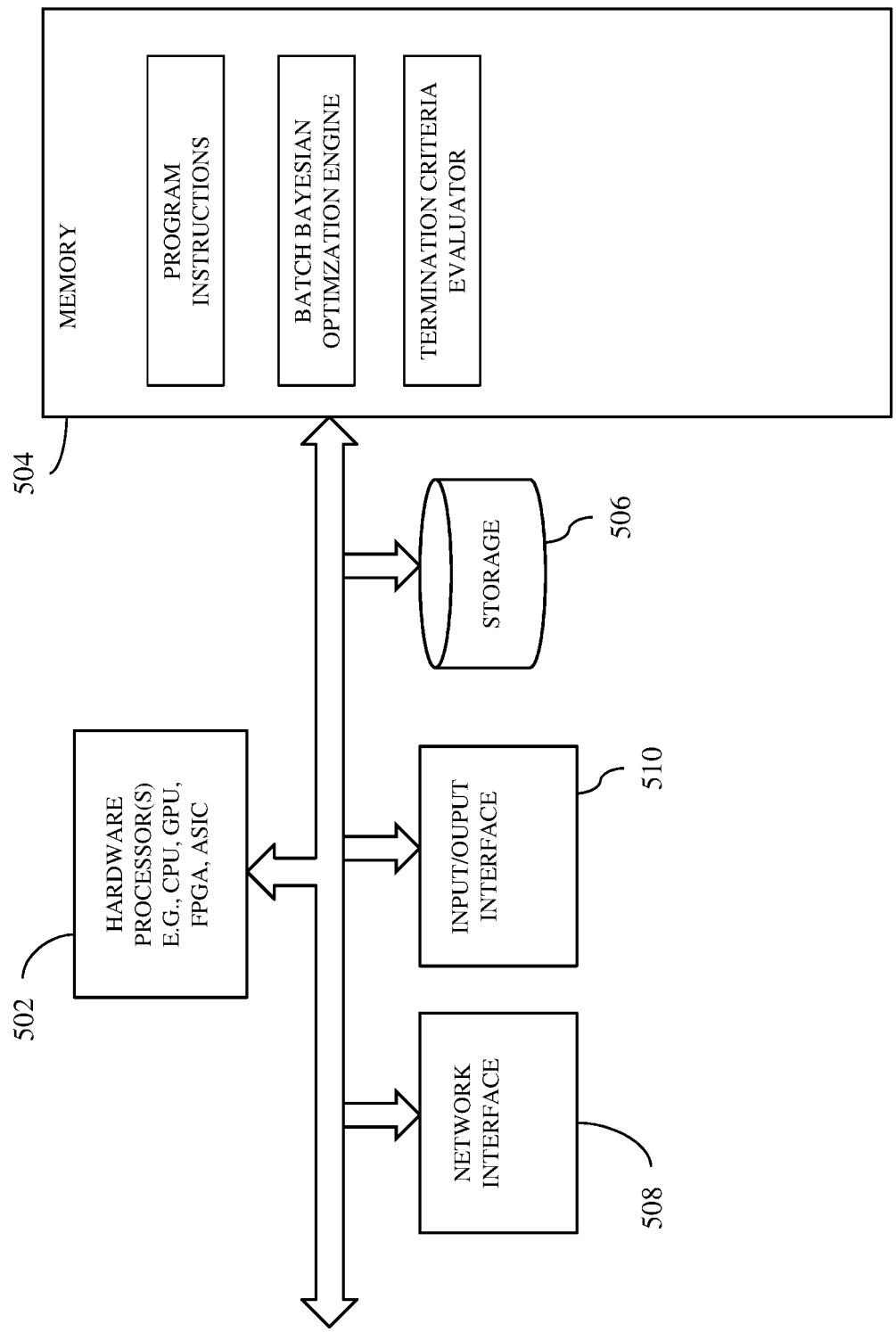
FIG. 5 is a diagram showing components of a system in one embodiment that provides early stopping intervention in real-time of a process.

FIG. 5 is a diagram showing components of a system in one embodiment that provides early stopping intervention in real-time of a process. One or more hardware processors 502 such as a central processing unit (CPU), a graphic process unit (GPU), and/or a Field Programmable Gate Array (FPGA), an application specific integrated circuit (ASIC), and/or another processor, may be coupled with a memory device 504, and perform batch Bayesian optimization and recommend candidate configurations to use in the process. A memory device 504 may include random access memory (RAM), read-only memory (ROM) or another memory device, and may store data and/or processor instructions for implementing various functionalities associated with the methods and/or systems described herein. One or more processors 502 may execute computer instructions stored in memory 504 or received from another computer device or medium. A memory device 504 may, for example, store instructions and/or data for functioning of one or more hardware processors 502, and may include an operating system and other program of instructions and/or data. One or more hardware processors 502 may receive input, which may include data for performing batch Bayesian optimization, batch size, target criterion, batch percentage criterion, budget (e.g., number of iterations). For instance, at least one hardware processor 502 may generate a recommendation (candidate configurations) and send the candidate configurations for trial runs in a real process in real-time. Candidate configurations are also used to determine whether a stopping criterion is met. Experimental run can be stopped early based on the stopping criterion being met. Recommendations and results of trial experimental runs based on the recommendations can be stored in a storage device 506. In an embodiment, input data can be received via a network interface 508 from a remote device, and may be temporarily loaded into a memory device 504 for performing the batch Bayesian optimization. One or more hardware processors 502 may be coupled with interface devices such as a network interface 508 for communicating with remote systems, for example, via a network, and an input/output interface 510 for communicating with input and/or output devices such as a keyboard, mouse, display, and/or others.

Figure 6:
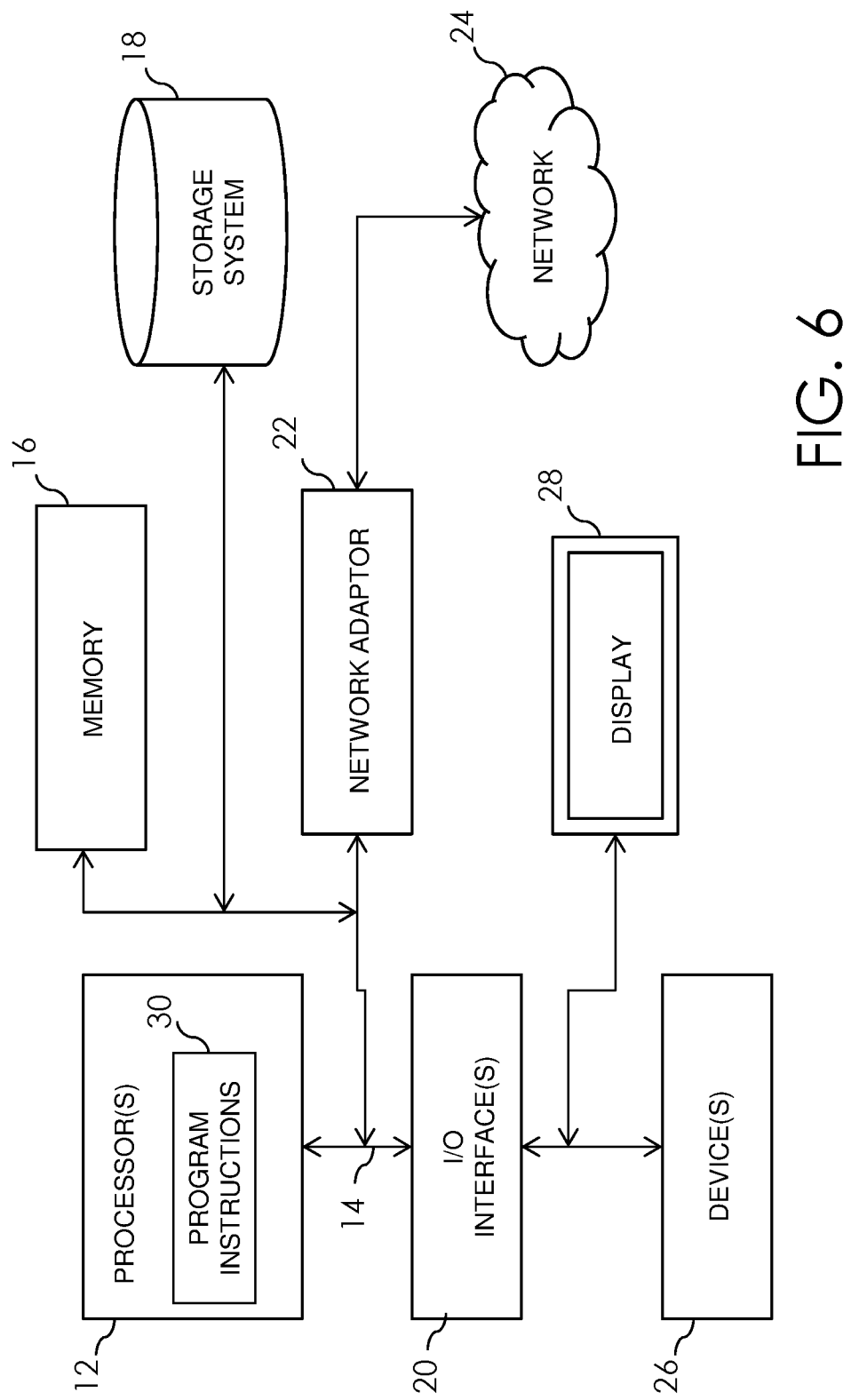
FIG. 6 illustrates a schematic of an example computer or processing system that may implement a system according to one embodiment.

FIG. 6 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
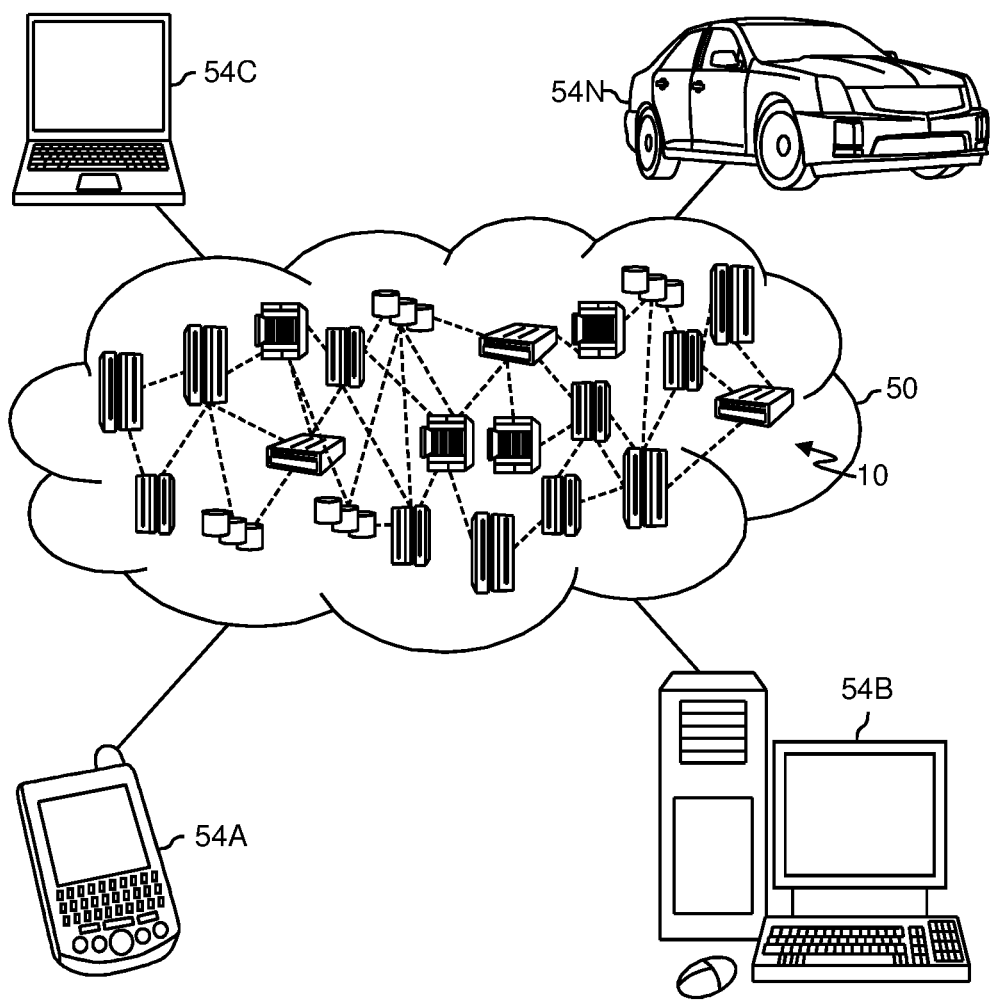
FIG. 7 illustrates a cloud computing environment in one embodiment.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
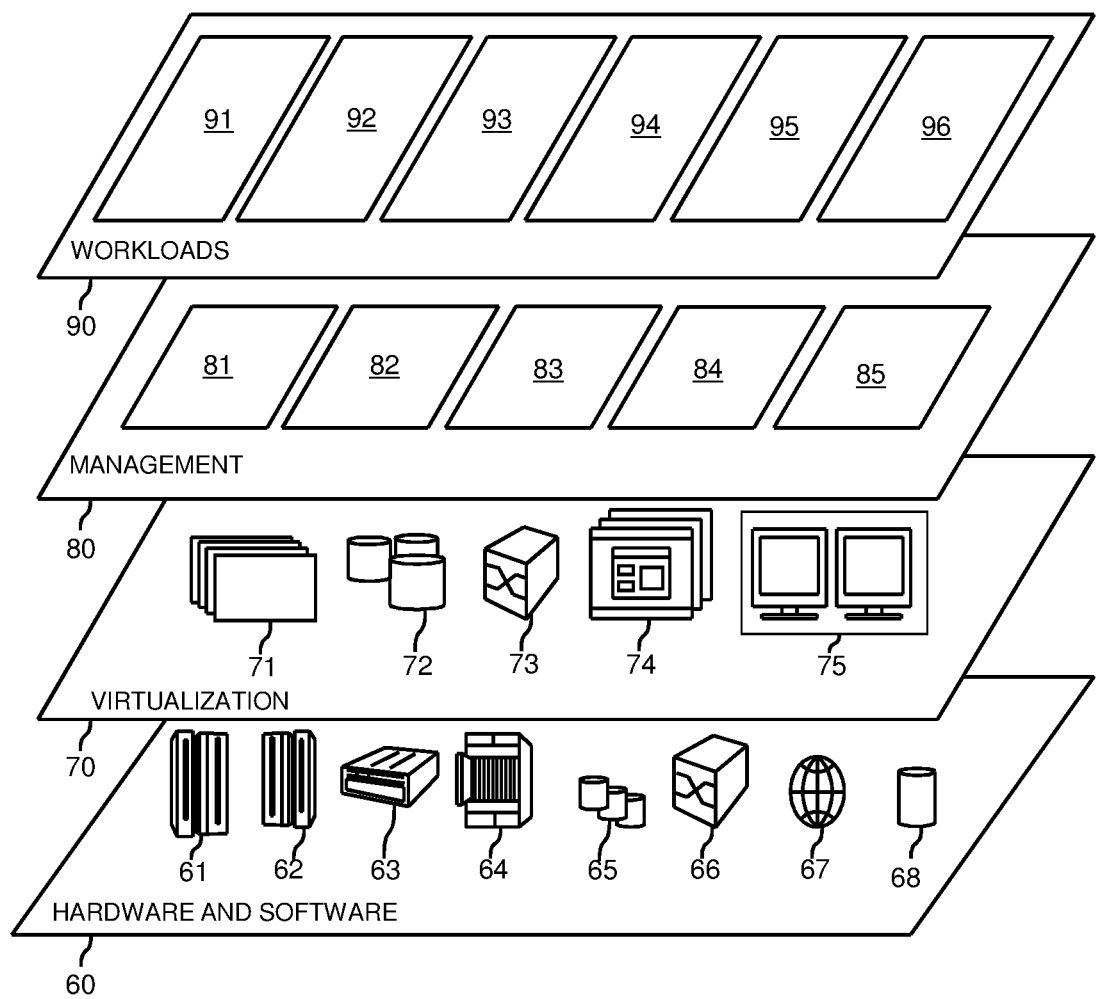
FIG. 8 illustrates a set of functional abstraction layers provided by cloud computing environment in one embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and early experiment stopping for batch Bayesian optimization processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of real-time intervention of an industrial process, comprising:
    searching for a batch of candidate configurations for use by the industrial process, the batch of candidate configurations searched for by performing a batch Bayesian optimization (BBO);
    transmitting the batch of candidate configurations to the industrial process to use in running the industrial process;
    receiving from the industrial process a result of the run;
    using the result in the BBO to search for a next batch of candidate configurations;
    determining whether a stopping criterion is met, based on the next batch of candidate configurations and by applying a function to a BBO acquisition score;
    responsive to determining that the stopping criterion is met, terminating a search for the next batch of candidates and controlling the industrial process to stop running; and
    responsive to determining that the stopping criterion is not met, transmitting the next batch of candidate configurations to the industrial process to use in running the industrial process and repeating the using the result in the BBO to search for a next batch of candidate configurations and the determining whether the stopping criterion is met.

2. The method of claim 1, wherein the function comprising evaluating data associated with the next batch of candidates based on a target criterion and a batch percentage criterion, the target criterion representing a statistical significance level needed to terminate the search, and the batch percentage criterion representing how much of a batch needs to fail to terminate the search.

3. The method of claim 2, wherein the determining whether a stopping criterion is met based on the next batch of candidate configurations includes:
    for each of the candidate configurations in the batch, computing a contextual probability of improvement (cPI) score; and
    determining that a percentage of the candidates configurations with the cPI score less than the target criterion is greater than the batch percentage criterion.

4. The method of claim 3, wherein the cPI score is determined as a cumulative distribution function (CDF) of a standard normal distribution of a combination of a mean of variances contained within a sampled posterior distribution, a predicted value from a candidate and a best candidate value discovered among iterations of BBO.

5. The method of claim 1, further including:
    responsive to determining that the stopping criterion is met, sending an optimal batch of configurations among batches of configurations found in the search to the industrial process.

6. The method of claim 1, further including:
    responsive to determining that the stopping criterion is met, sending an optimal batch of configurations among batches of configurations found in the search to a user via a user interface.

7. The method of claim 2, wherein the target criterion and the batch percentage criterion are configurable.

8. A system for real-time intervention of an industrial process, comprising:
    a hardware processor; and
    a memory device coupled with the hardware processor;
    the hardware processor configured to at least:
        search for a batch of candidate configurations for use by the industrial process, the batch of candidate configurations searched for by performing a batch Bayesian optimization (BBO);
        transmit the batch of candidate configurations to the industrial process to use in running the industrial process;
        receive from the industrial process a result of the run;
        use the result in the BBO to search for a next batch of candidate configurations;
        determine whether a stopping criterion is met, based on the next batch of candidate configurations and by applying a function to a BBO acquisition score;
        responsive to determining that the stopping criterion is met, terminate a search for the next batch of candidates and control the industrial process to stop running; and
        responsive to determining that the stopping criterion is not met, transmit the next batch of candidate configurations to the industrial process to use in running the industrial process and repeating using of the result in the BBO to search for a next batch of candidate configurations and determining of whether the stopping criterion is met.

9. The system of claim 8, wherein the hardware processor applying a function includes evaluating data associated with the next batch of candidates based on a target criterion and a batch percentage criterion, the target criterion representing a statistical significance level needed to terminate the search, and the batch percentage criterion representing how much of a batch needs to fail to terminate the search.

10. The system of claim 9, wherein to determine whether a stopping criterion is met based on the next batch of candidate configurations, the hardware processor is configured to:
for each of the candidate configurations in the batch, compute a contextual probability of improvement (cPI) score; and
determine that a percentage of the candidates configurations with the cPI score less than the target criterion is greater than the batch percentage criterion.

11. The system of claim 10, wherein the cPI score is determined as a cumulative distribution function (CDF) of a standard normal distribution of a combination of a mean of variances contained within a sampled posterior distribution, a predicted value from a candidate and a best candidate value discovered among iterations of BBO.

12. The system of claim 8, wherein the hardware processor is further configured to:
responsive to determining that the stopping criterion is met, send an optimal batch of configurations among batches of configurations found in the search to the industrial process.

13. The system of claim 8, wherein the hardware processor is further configured to:
responsive to determining that the stopping criterion is met, send an optimal batch of configurations among batches of configurations found in the search to a user via a user interface.

14. The system of claim 9, wherein the target criterion and the batch percentage criterion are configurable.

15. A computer program product comprising a non-transitory computer readable storage medium having program instructions embodied therewith, the program instructions readable by a device to cause the device to:
search for a batch of candidate configurations for use by the industrial process, the batch of candidate configurations searched for by performing a batch Bayesian optimization (BBO);
transmit the batch of candidate configurations to the industrial process to use in running the industrial process;
receive from the industrial process a result of the run;
use the result in the BBO to search for a next batch of candidate configurations;
determine whether a stopping criterion is met, based on the next batch of candidate configurations and by applying a function to a BBO acquisition score;
responsive to determining that the stopping criterion is met, terminate a search for the next batch of candidates, terminating the search controlling the industrial process to stop running; and
responsive to determining that the stopping criterion is not met, transmit the next batch of candidate configurations to the industrial process to use in running the industrial process and repeat using of the result in the BBO to search for a next batch of candidate configurations and determining of whether the stopping criterion is met.

16. The computer program product of claim 15, wherein the device is caused to apply the function by evaluating data associated with the next batch of candidates based on a target criterion and a batch percentage criterion, the target criterion representing a statistical significance level needed to terminate the search, and the batch percentage criterion representing how much of a batch needs to fail to terminate the search.

17. The computer program product of claim 16, wherein to determine whether a stopping criterion is met based on the next batch of candidate configurations, the device is caused to:
for each of the candidate configurations in the batch, compute a contextual probability of improvement (cPI) score; and
determine that a percentage of the candidates configurations with the cPI score less than the target criterion is greater than the batch percentage criterion.

18. The computer program product of claim 17, wherein the cPI score is determined as a cumulative distribution function (CDF) of a standard normal distribution of a combination of a mean of variances contained within a sampled posterior distribution, a predicted value from a candidate and a best candidate value discovered among iterations of BBO.

19. The computer program product of claim 15, wherein the device is further caused to:
responsive to determining that the stopping criterion is met, send an optimal batch of configurations among batches of configurations found in the search to the industrial process.

20. The computer program product of claim 16, wherein the target criterion and the batch percentage criterion are configurable.

* * * * *